Oct. 22, 1929.　　　F. V. DETWILER　　　1,732,554
COOKING UTENSIL
Filed Nov. 12, 1928　　2 Sheets-Sheet 1
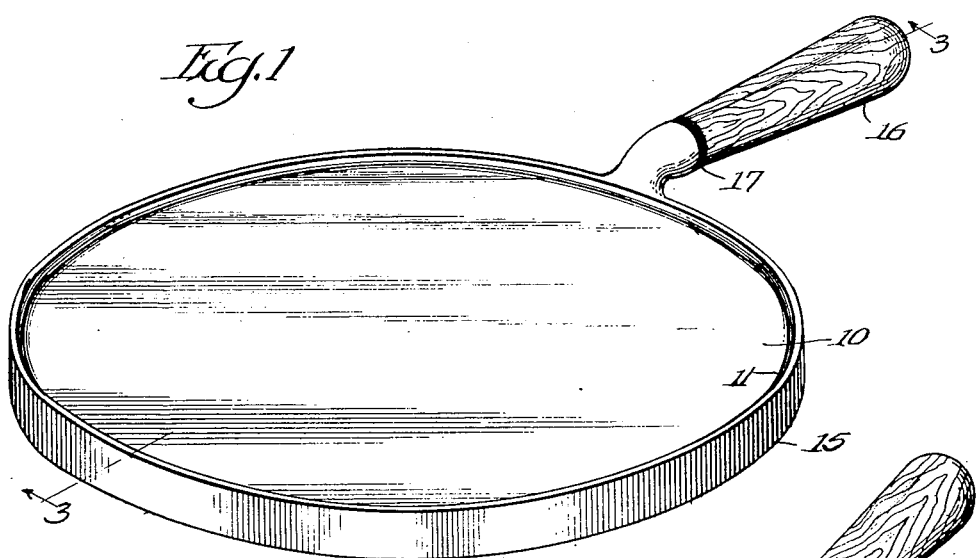
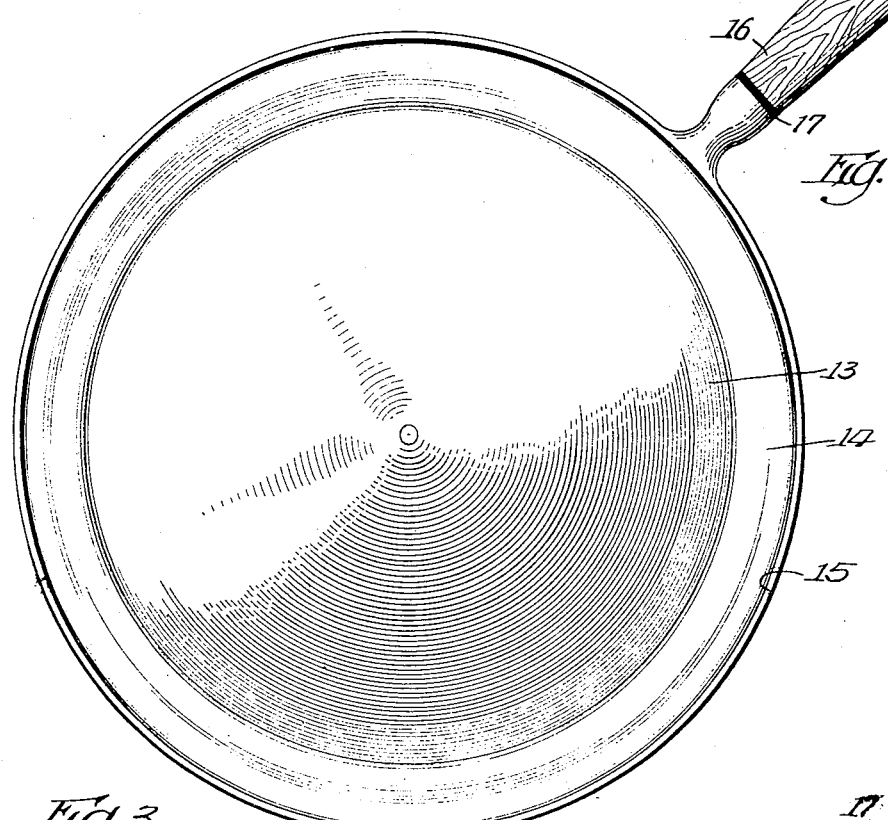
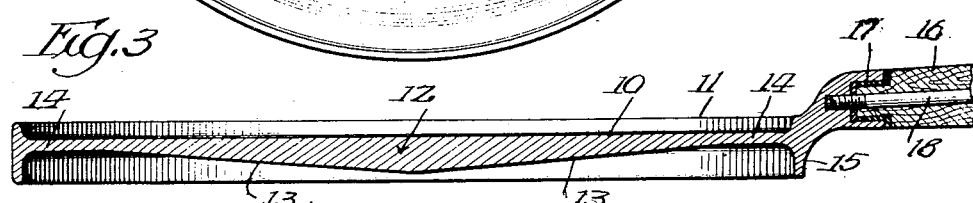
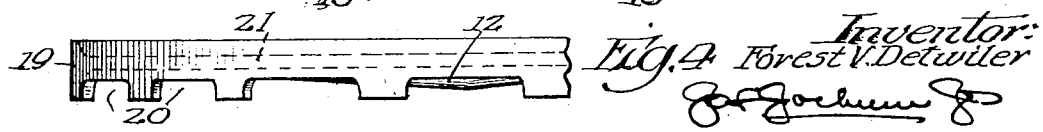
Inventor:
Forest V. Detwiler Oct. 22, 1929.  F. V. DETWILER  1,732,554
COOKING UTENSIL
Filed Nov. 12, 1928   2 Sheets-Sheet 2
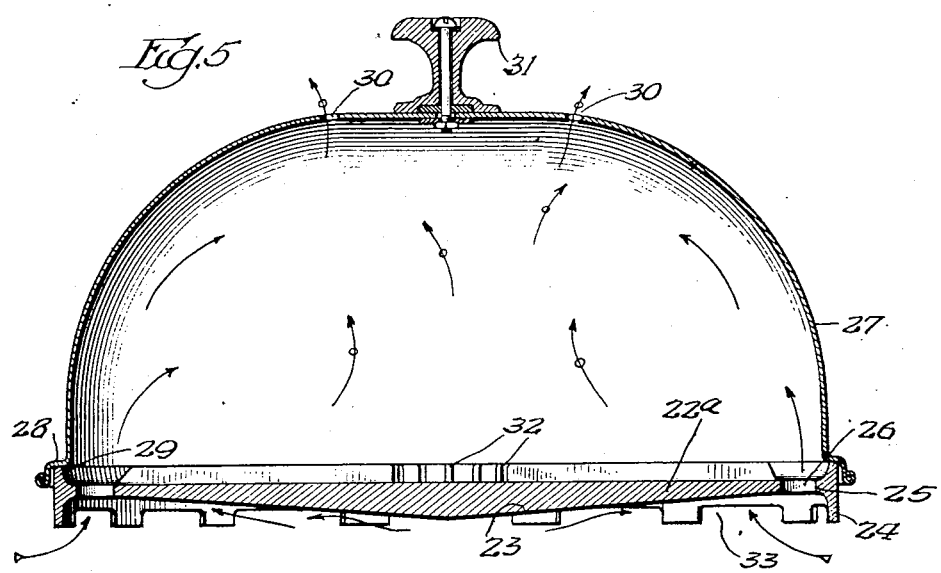
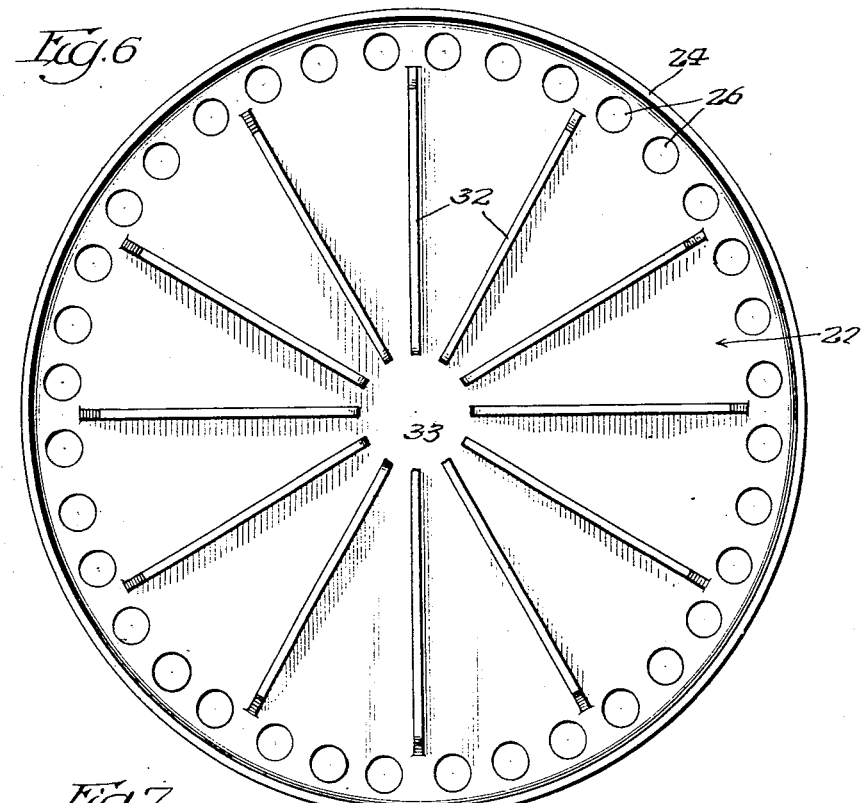
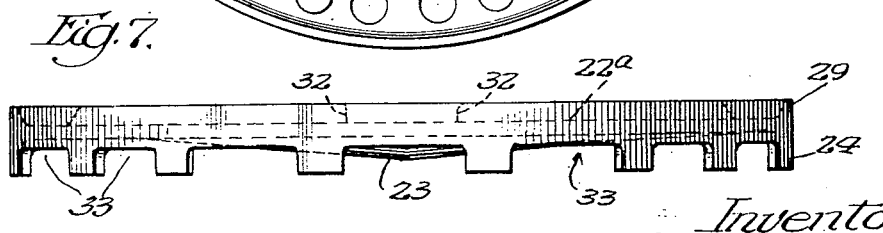
Inventor:
Forest V. Detwiler
By [signature] Atty.

Patented Oct. 22, 1929

1,732,554

UNITED STATES PATENT OFFICE

FOREST V. DETWILER, OF CHICAGO, ILLINOIS

COOKING UTENSIL

Application filed November 12, 1928. Serial No. 318,720.

This invention relates to improvements in cooking utensils, and one of the objects of the invention is to provide an improved apparatus of this character which may be employed as a griddle or an oven, as may be desired, and is adapted for use with a gas or vapor stove or with a source of supply of electric or other sufficient heat.

A further object is to provide an improved device of this character in which there will be an even distribution of heat which results in an economical use of fuel and an effective and efficient use of heat for cooking materials of different kinds.

A further object is to provide an improved device of this character which may be readily stamped from sheet metal or formed by casting the same, with a conically arranged deflecting portion depending from the bottom thereof, so that there will be an equalization of the heat throughout the entire area of the cooking surface and with a further result that when the device is formed of cast material, when the flame or source of applied heat is reduced, the stored heat in the thicker portion of the material will radiate towards the periphery thereof, and the entire cooking surface will be maintained at a uniform heat or temperature.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a perspective view of a griddle constructed in accordance with the principles of this invention.

Figure 2 is a bottom plan view of Figure 1.

Figure 3 is a sectional view taken on line 3—3, Figure 1.

Figure 4 is a side elevation, partly broken away, of a modified form of the invention.

Figure 5 is a vertical sectional view of a heating plate constructed in accordance with the principles of this invention and having a cover attachment in connection therewith.

Figure 6 is a top plan view of the plate shown in Figure 5.

Figure 7 is a side elevation of the heating plate.

Referring more particularly to the drawings and in the form of the invention shown in Figures 1 to 4, the numeral 10 designates generally a griddle having an upwardly projecting circumferential flange 11. In this form of the invention the griddle is constructed preferably of cast material, the body portion thereof as at 12 is of considerable thickness and the lower surface 13 of the body tapers from the center toward the periphery of the body, the tapered portion terminating short of the circumferential flange to form a portion 14 adjacent the flange and beyond the periphery of the tapered or conical portion which is preferably of a substantially uniform thickness and depending below the lower face of the griddle is a circumferential flange 15 which terminates at a point below the apex of the conical portion. The portion of the body 14 which is of a substantially uniform thickness forms a clearly defined zone between the flange 15 and the periphery of the base of the tapered portion 13.

Connected with the griddle in any suitable manner is a handle 16 which is preferably insulated therefrom as at 17 and is detachably secured in position by means of a suitable fastening device 18.

This form of the invention is particularly adapted for use with what is known as radiant heat, that is for electric heaters and is adapted to be placed over the heating element, the heat rising from the element so as to strike the conical or tapered portion 13 which forms a deflector, the heated air currents flowing against the deflector toward the periphery of the griddle. The depending flange 15 prevents the heated air from escaping around the periphery of the griddle and the heated air will be trapped or pocketed beneath the portion 14 of the body.

When the griddle becomes heated, the portion 12 of the body which is of a considerably greater thickness than the remaining portion of the griddle will absorb the heat to such an extent that the supply of heat may be reduced, with the result that the accumulated heating portion 12 of the griddle will radiate in the body of the griddle toward the peripheral portions 14, and with the further result that whether the source of heat is applied to the griddle or whether it is reduced, the griddle will be of substantially the same temperature at the peripheral portions 14 as in the central portion of the griddle.

Furthermore, the increased thickness of the portion 12 of the griddle will prevent the griddle from buckling under the heat.

This form of the invention is also adapted to be used in connection with a heating flame and in order to support combustion, the depending flange 19, corresponding with the flange 15, is provided with cut away portions 20 to form comparatively large openings so as to permit outside air to freely flow into the space within the flange 19 to support combustion. The tops of the openings 20 are spaced below the bottom of the body 21 of the griddle so as to form a flange 22 that will cause the heated air to be pocketed between the conical bottom of the body portion and the flange 19 so that it will not escape directly from beneath the griddle.

In the form of the invention shown in Figures 5 to 7, the heating plate 22ª is provided with a conical bottom 23 which terminates short of the depending circumferential flange 24 and is provided with the portions 25 adjacent the flange 24 which is of substantially uniform diameter from the periphery of the conical portion to the flange and openings 26 are provided through the portion 25 so as to permit the heated air from the lower side of the plate 22ª to escape through the openings to the top side of the plate.

A cover 27 is separately connected with the plate 22ª and is preferably provided with a shoulder 28 adapted to rest upon the edge of the upwardly projecting circumferential flange 29. The cover is provided with openings 30 to permit the escape of vapor and a handle 31 is also provided for the cover.

Arranged upon the top of the plate 22ª are radial ribs 32 which terminate short of the center of the plate as at 33 and extend for any desired distance above the top of the plate. These ribs 32 also terminate short of the apertures or openings 26 and serve as a means for reinforcing or strengthening the plate to hold the same against warping or buckling and will also serve as a means for holding an article or receptacle which is placed thereupon above and out of direct contact with the upper surface of the plate 22ª.

The downwardly projecting flange 24 is provided with cut away portions 33 so as to permit air to enter beneath the plate 22ª.

With this form of the invention the products of combustion will be deflected by the conical bottom 23 of the plate 22ª and directed toward and through the openings 26 to flow in the directions indicated by the arrow beneath the cover 27 and into the cooking chamber formed by the cover and the plate 22ª. Any moisture formed within the chamber thus formed will escape through the openings 30, the flange 24 preventing the heated air or products of combustion from escaping beyond the periphery of the plate and to cause them to be directed through the openings 26.

With this invention the additional thickness of the metal at the center of the plate will, while the plate is being heated, store up the heat and after the source of heat has been reduced to at least one-half of the amount of the former supply or reduced to a greater extent, the heat thus stored will radiate toward the periphery of the body portion and when the openings 26 are employed, will be directed through the openings.

Furthermore, the additional thickness of the body portion at the center thereof will equalize the heat in the cooking chamber and prevents the burning of the article being cooked, and causes them to be cooked equally on the top as on the bottom thereof, the ribs or projections 32 serving to hold the bottom of the container in which the food is to be cooked or the food itself, when placed upon the ribs, out of contact with the upper surface of the heating plate.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A cooking utensil embodying a griddle, formed of a single casting having considerable thickness at its center, the upper face of the griddle being flat substantially to the periphery thereof, the lower face of the griddle tapering towards the periphery thereof to form a conical deflector, whereby the thickness of the material will decrease towards the circumference of the griddle, the base of said deflector terminating short of the periphery of the griddle to form a clearly defined zone, the thickness of said griddle being substantially uniform through the area of said zone.

2. A cooking utensil embodying a griddle, formed of a single casting having considerable thickness at its center, the upper face of the griddle being flat substantially to the periphery thereof, the lower face of the griddle tapering towards but terminating considerably short of the periphery thereof to form a conical deflector, whereby the thickness of the material will decrease towards and a clearly defined area of substantially uniform thickness will be formed adjacent the circumference of the griddle, and a circumferential flange depending from the griddle and exteding below the apex of said deflector and encompassing the said zone.

3. A cooking utensil embodying a griddle, formed of a single casting having considerable thickness at its center, the lower face of the griddle tapering towards the periphery thereof to form a conical deflector, whereby the thickness of the material will decrease towards the circumference of the griddle, and a circumferential flange depending from the griddle and extending below the apex of said deflector and spaced from the periphery of the base of said deflector to form in the casting a clearly defined area of substantially uniform thickness, said griddle being provided with apertures through the body adjacent its periphery.

4. A cooking utensil embodying a heating plate formed of a single casting having considerable thickness at its center, the lower face of said plate tapering towards the periphery thereof to form a conical deflector whereby the thickness of the material will decrease towards the circumference of the plate, and spaced supporting projections extending above the upper face of the plate, said plate having openings therethrough adjacent the periphery thereof.

5. A cooking utensil embodying a griddle, a deflector connected with and depending below the lower face of the griddle to deflect the heat to the circumference of the griddle, and a flange depending from and encompassing the griddle and below said deflector, the circumference of said deflector terminating short of the circumference of the said griddle, the portion of the griddle beyond the circumference of the said deflector being of a substantially uniform thickness.

6. A cooking utensil embodying a griddle, formed of a single casting having considerable thickness at its center, the lower face of the griddle tapering towards the periphery thereof to form a conical deflector, whereby the thickness of the material will decrease towards the circumference of the griddle, the circumference of the conical deflecting portion being spaced from the circumference of the griddle, the said griddle being of a substantially uniform thickness between its circumference and the circumference of said conical deflector.

7. A cooking utensil embodying a griddle, formed of a single casting having considerable thickness at its center, the lower face of the griddle tapering towards the periphery thereof to form a conical deflector, whereby the thickness of the material will decrease towards the circumference of the griddle, a circumferential flange depending from the griddle and extending below the apex of said deflector, the circumference of the conical deflecting portion being spaced from the circumference of the griddle, the griddle being of substantially uniform thickness between the circumference of said deflecting portion and the griddle, there being apertures through the last said portion of the griddle adjacent the periphery thereof, and a circumferential flange depending below the griddle and extending below the apex of said deflector.

8. A cooking utensil embodying a griddle, formed of a single casting having considerable thickness at its center, the lower face of the griddle tapering towards the periphery thereof to form a conical deflector, whereby the thickness of the material will decrease towards the circumference of the griddle, a circumferential flange depending from the griddle and extending below the apex of said deflector, the circumference of the conical deflecting portion being spaced from the circumference of the griddle, the griddle being of substantially uniform thickness between the circumference of said deflecting portion and the griddle, there being apertures through the last said portion of the griddle adjacent the periphery thereof, a circumferential flange depending below the griddle and extending below the apex of said deflector, and a detachable cover to form with said griddle a cooking chamber.

9. A cooking utensil embodying a heating plate having an upper surface flat to substantially the periphery thereof, a conical deflector secured to and depending below the bottom of the plate, said deflector terminating short of the circumference of the plate, the portion of the plate between its circumference and the circumference of the deflector being of a substantially uniform thickness.

10. A cooking utensil embodying a body portion having an upper face flat to substantially the periphery thereof, a conical deflector secured to and depending below the lower face of the said body portion, said deflector terminating short of the circumference of the said body portion, the portion of the said body between its circumference and the circumference of the deflector being of a substantially uniform thickness, and a circumferential flange projecting above the said upper face.

In testimony whereof I have signed my name to this specification, on this first day of June, A. D., 1928.

FOREST V. DETWILER.